United States Patent
Mucciarone

(10) Patent No.: US 10,914,085 B1
(45) Date of Patent: Feb. 9, 2021

(54) SYSTEM AND METHOD FOR PROVIDING A LEVEL FLOORING SURFACE

(71) Applicant: John Mucciarone, Brooklyn, NY (US)

(72) Inventor: John Mucciarone, Brooklyn, NY (US)

( * ) Notice: Subject to any disclaimer, the term of this patent is extended or adjusted under 35 U.S.C. 154(b) by 0 days.

(21) Appl. No.: 16/743,048

(22) Filed: Jan. 15, 2020

(51) Int. Cl.
*E04G 21/10* (2006.01)
*G01C 9/02* (2006.01)
*G01C 15/00* (2006.01)

(52) U.S. Cl.
CPC .............. *E04G 21/10* (2013.01); *G01C 9/02* (2013.01); *G01C 15/008* (2013.01)

(58) Field of Classification Search
CPC ........................... E04G 21/10; E04G 23/0288
See application file for complete search history.

(56) References Cited

U.S. PATENT DOCUMENTS

| | | | | |
|---|---|---|---|---|
| 4,360,993 A * | 11/1982 | Tomokazu | .......... | E04F 13/0807 52/365 |
| 7,241,819 B2 * | 7/2007 | Bowe | .......... | C04B 28/14 427/403 |
| 7,975,449 B2 * | 7/2011 | LaRocque | .......... | E04F 21/00 52/514 |
| 8,261,511 B1 * | 9/2012 | Kirby | .......... | E04G 21/10 52/749.1 |
| 10,047,534 B2 * | 8/2018 | Matsudo | .......... | E04G 23/0288 |
| 2007/0294963 A1 * | 12/2007 | Doerscher | .......... | E04G 23/0288 52/126.1 |
| 2008/0236059 A1 * | 10/2008 | Mershon | .......... | E04G 21/10 52/103 |
| 2010/0088999 A1 * | 4/2010 | LaRocque | .......... | E04F 21/00 52/745.05 |
| 2014/0290169 A1 * | 10/2014 | McCuen | .......... | E01C 23/10 52/514.5 |
| 2016/0177523 A1 * | 6/2016 | McCuen | .......... | E01C 23/10 404/107 |
| 2017/0342730 A1 * | 11/2017 | Matsudo | .......... | E04G 23/0288 |

* cited by examiner

*Primary Examiner* — Rodney Mintz
(74) *Attorney, Agent, or Firm* — Gerald E. Hespos; Michael J. Porco; Matthew T. Hespos

(57) ABSTRACT

A system and method for providing a level flooring surface includes a plurality of groups of leveling blocks, wherein each of the plurality of groups has a defined height different from the others of the plurality of groups of leveling blocks and a defined color different from the others of the plurality of groups of leveling blocks. Each of the leveling blocks has an adhesive layer so that the leveling blocks can be fixed to a surface. The leveling blocks are selectively adhered to a surface in a grid-like pattern so that upper surfaces of each of the leveling blocks are substantially planar with a pre-identified zero-level elevation so that a level flooring surface can be installed based on visual confirmation of elevation levels along the grid-like pattern.

6 Claims, 3 Drawing Sheets

SYSTEM AND METHOD FOR PROVIDING A LEVEL FLOORING SURFACE

BACKGROUND OF THE INVENTION

Field of the Invention

The present disclosure relates to a system and method for providing a level flooring surface.

Description of the Related Art

In the construction industry, a considerable amount of time and energy is expended in an effort to provide a level surface on which hardwood, tile, or any other type of flooring can be laid. Typically, the flooring process involves several steps. First, a concrete layer is poured and allowed time to set. Next, the actual level of the concrete layer is determined. There are several different methods for determining the actual level of the concrete layer. Generally, an individual determines a "zero level." The zero level may be the highest point of the concrete level. Next, the area is divided into a grid and measurements are taken at predetermined intervals. For instance, the floor level may be measured every 3 feet in both length and width dimensions of the area to define a series of measurement points. There are several different methods for measuring an elevation level of each of the series of measurement points. For example, there are many types of instruments, such as gas meters and laser levels, and other known types that can be used to determine the elevation. In the next step, the actual elevation of each of the measurement points is marked. Finally, a layer of self-leveling concrete is poured and a level flooring surface is achieved.

The step in which the actual elevation level of each of the series of measurement points is marked provides the greatest chance for error. There are several different ways in which the actual elevation can be marked. For instance, the actual elevation difference relative to the zero level can be written on the floor. However, the writing is immediately covered during the self-leveling concrete step and a level flooring surface cannot be easily achieved. Leveling pegs are also commonly used. The leveling peg generally comprises a base with an adhesive bottom surface a measurement peg projecting from a top surface of the base. The measurement peg has indicia on at least one surface denoting a projecting height. The measurement peg is cut so that the top-most remaining portion of the measurement peg has an elevation equal to the zero level. The self-leveling concrete is then poured so that the top surface of the self-leveling concrete shares a common plane with the top-most remaining portion of each of the measurement pegs.

There are several drawbacks to the leveling pegs. First, it is difficult to accurately cut the leveling pegs to the appropriate height. Second, the actual height of the leveling pegs must be determined while pouring the self-leveling concrete step and errors are likely to occur. Finally, the leveling pegs all have the same outward appearance (i.e., shape and color) and are difficult to distinguish from one another. Accordingly, an individual must visually inspect each peg before pouring the self-leveling concrete in a particular area.

In view of the above, an object of the present invention is to provide a system for providing a level flooring surface that can be quickly and accurately verified.

SUMMARY

A system and method for providing a level flooring surface is provided. The system comprises a first plurality of leveling blocks having a first height and a second plurality of leveling blocks having a second height greater than the first height. In the preferred embodiment, the system comprises a plurality of distinct groups of leveling blocks, wherein each groups has a distinct predetermined height. In the preferred embodiment, the leveling blocks of a first group have a first height of ⅛", the leveling blocks of a second group have a second height of ¼", the leveling blocks of a third group have a third height of ⅜", the leveling blocks of a fourth group have a fourth height of ½", the leveling blocks of a fifth group have a fifth height of ⅝", and the leveling blocks of a sixth group have a sixth height of ⅞" However, the invention is not limited to the disclosed embodiment. Any number of groups having distinct predetermined heights may be used. For instance, additional groups of leveling blocks can have heights of 1" or greater, or alternatively could use metric measurements. Further, the leveling blocks of different heights can be stacked together to achieve any height.

To visually distinguish the various groups of blocks, each group of blocks is assigned a distinct color. For instance, in the preferred embodiment the leveling blocks of the first group are red, the leveling blocks of the second group are black, the leveling blocks of the third group are yellow, and the leveling blocks of the fourth group are blue. Further, the leveling blocks of the fifth group will be gray and the leveling blocks of the sixth group will be white. However, any color combination may be used or assigned to each group. Alternatively, the groups of blocks may be coded with a pattern, design, or other indicia.

Each of the leveling blocks is preferably rectangular and has opposite top and bottom surfaces. However, the leveling blocks can be any shape and have any configuration. The bottom surfaces has an adhesive layer and a peel-away covering. The covering is removed so that the leveling block can be adhered to a surface.

A method for using the leveling block system will now be described. In a first step, a layer of concrete is poured on a pre-existing surface. The concrete layer may be any concrete composition now known or later developed. The concrete layer is allowed time to set and harden.

In a second step, variations in elevation of the concrete layer are determined. First, a "zero level" is determined. The zero level is preferably the highest point of the concrete layer. Next, a grid is marked over the area with measurement points a predetermined distance from the zero level. For instance, measurement points may be formed every three feet in both length and width directions across the area. Measurement points may be also formed at 4 foot or 5 foot increments, or any other distance.

In a third step, surface elevation measurements are taken at each of the measurement points. The surface elevation measurements may be taken by any means now known or later developed, including, but not limited to gas meters, laser transit, and any other known instrument.

In a fourth step, a leveling block is adhered to each of the measurement points on the basis of the surface elevation measurement relative to the zero level. For instance, if a first surface elevation measurement at a first measurement point is ¼" below the zero level, a black ¼" leveling block will be adhered to the first measurement point. Likewise, if a second surface elevation measurement at a second measurement point is ⅛" below the zero level, a red ⅛" leveling block will be adhered to the second measurement point. Of course, the incremental measurements and color scheme of the leveling blocks can vary. The fourth step is repeated until leveling blocks have been placed at each measurement point. After leveling blocks have been placed at each measurement point, the top surface of each of the leveling blocks is planar with the zero level.

In a fifth step, a layer of self-leveling concrete is poured over the entire area. An individual may use any known means for pouring or disbursing the self-leveling concrete. The individual will pour the self-leveling concrete so that the upper surface of the dried self-leveling concrete is planar with the top surface of the leveling blocks. Accordingly, a level flooring surface is achieved.

In a sixth step, a flooring surface is laid over the level flooring surface. The flooring surface may be hardwood, tile, laminate, or any other flooring surface.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
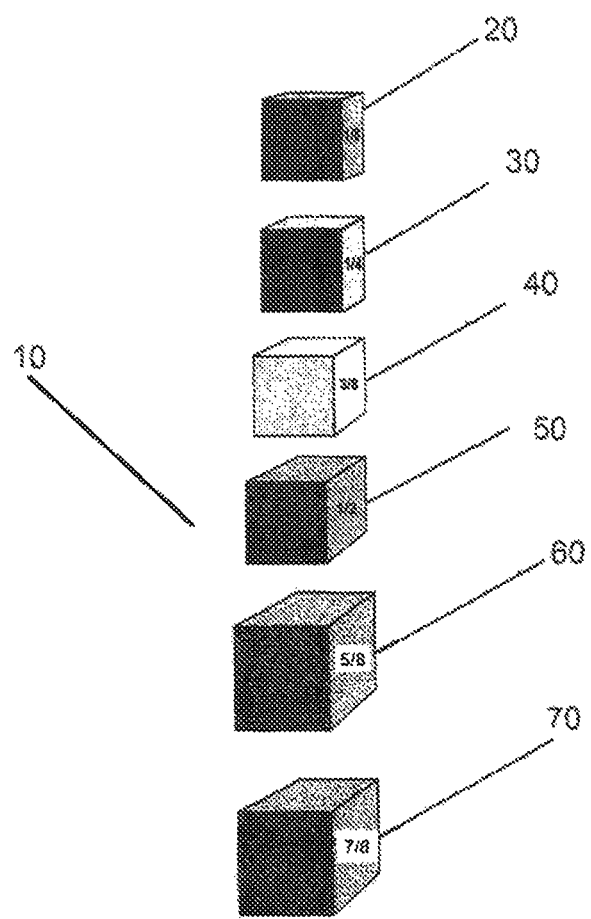
FIG. 1 is a plan view of a plurality of leveling blocks.
Figure 2:
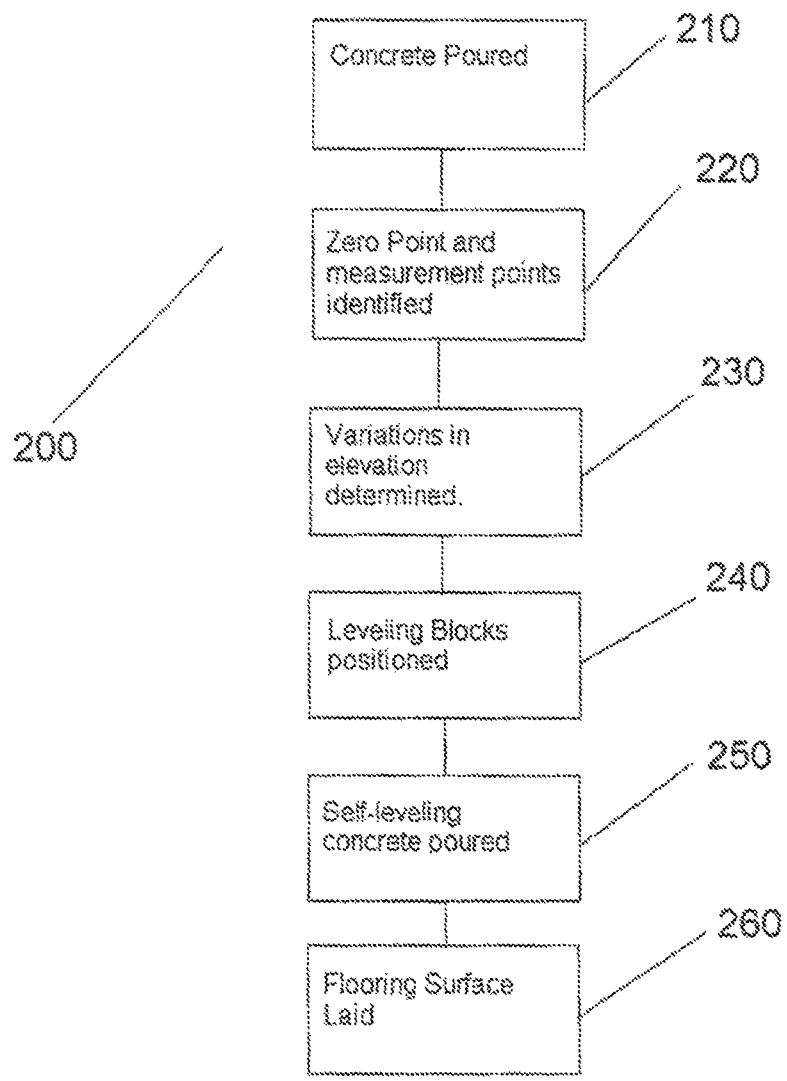
FIG. 2 is a flow chart of a method for providing a level flooring surface.
Figure 3:
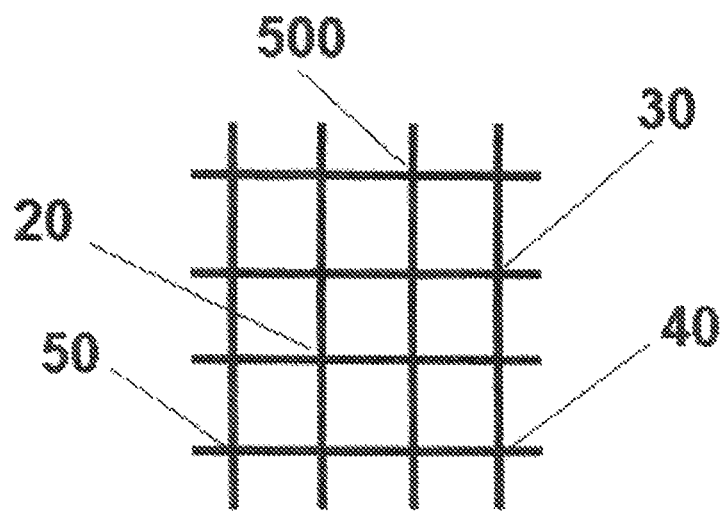
FIG. 3 is a plan view of a plurality of leveling blocks arranged in a grid.

Preferred embodiments of the present disclosure will be described hereinbelow with reference to the accompanying drawings. In the following description, well-known functions or constructions are not described in detail to avoid obscuring the present disclosure in unnecessary detail.

A system and method for providing a level flooring surface is provided. The system 10 comprises at least a first group of leveling blocks 20 having a first height and a second group of leveling blocks 30 having a second height greater than the first height. In the preferred embodiment, the system 10 comprises a plurality of distinct groups of leveling blocks, wherein each groups has a distinct predetermined height. In the preferred embodiment, the leveling blocks of a first group 20 have a first height of ⅛", the leveling blocks of a second group 30 have a second height of ¼", the leveling blocks of a third group 40 have a third height of ⅜", the leveling blocks of a fourth group 50 have a fourth height of ½", the leveling blocks of a fifth group 60 have a fifth height of ⅝", and the leveling blocks of a sixth group 70 have a sixth height of ⅞" However, the invention is not limited to the disclosed embodiment. Any number of groups having distinct predetermined heights may be used. For instance, additional groups of leveling blocks can have heights of 1" or greater, or alternatively could use metric measurements. Further, a plurality of individual blocks of different groups can be stacked together to achieve any height.

To visually distinguish the various groups of blocks, each group of blocks is assigned a distinct color. For instance, in the preferred embodiment the leveling blocks of the first group 20 are red, the leveling blocks of the second group 30 are black, the leveling blocks of the third group 40 are yellow, the leveling blocks of the fourth group 50 are blue, the leveling blocks of the fifth group 60 are gray, and the leveling blocks of the fifth group 70 are white. However, any color combination may be used or assigned to each group. Alternatively, the groups of blocks may be coded with a pattern, design, or other indicia.

Each of the leveling blocks is preferably rectangular and has opposite top and bottom surfaces 100, 102. However, the leveling blocks can be any shape and have any configuration. The bottom surface 102 has an adhesive layer 104 and a peel-away covering 106. The covering is removed so that the leveling block can be adhered to a surface.

A method 200 for using the leveling block system will now be described. In a first step 210, a layer of concrete is poured on a pre-existing surface. The concrete layer may be any concrete composition now known or later developed. The concrete layer is allowed time to set and harden.

In a second step 220, variations in elevation of the concrete layer are determined. First, a "zero level" is determined. The zero level is preferably the highest point of the concrete layer. Next, a grid is marked over the area with measurement points a predetermined distance from the zero level. For instance, measurement points may be formed at three, four, or five foot increments in both length and width directions across the area.

In a third step 230, surface elevation measurements are taken at each of the measurement points. The surface elevation measurements may be taken by any means now known or later developed, including, but not limited to gas and laser levels.

In a fourth step 240, a leveling block is adhered to each of the measurement points on the basis of the surface elevation measurement relative to the zero level. For instance, if a first surface elevation measurement at a first measurement point is ¼" below the zero level, a black ¼" leveling block will be adhered to the first measurement point. Likewise, if a second surface elevation measurement at a second measurement point is ⅛" below the zero level, a red ⅛" leveling block will be adhered to the second measurement point. Of course, the incremental measurements and color scheme of the leveling blocks can vary. The fourth step is repeated until leveling blocks have been placed at each measurement point. After leveling blocks have been placed at each measurement point, the top surface of each of the leveling blocks is planar with the zero level.

In a fifth step 250, a layer of self-leveling concrete is poured over the entire area. An individual may use any known means for pouring or disbursing the self-leveling concrete. The individual will pour the self-leveling concrete so that the upper surface of the dried self-leveling concrete is planar with the top surface of the leveling blocks. Accordingly, a level flooring surface is achieved.

In a sixth step 260, a flooring surface is laid over the level flooring surface. The flooring surface may be hardwood, tile, laminate, or any other flooring surface.

While the disclosure has been shown and described with reference to certain preferred embodiments thereof, it will be understood by those skilled in the art that various changes in form and detail may be made therein without departing from the spirit and scope of the disclosure.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A method for providing a level flooring surface, comprising the steps of:

pouring a concrete layer on top of an underlying building surface;

marking a plurality of measurement points on the concrete layer in a grid pattern after the concrete layer hardens;

measuring variations in surface level elevation at each of the plurality of measurement points;

identifying a zero level measurement point from the plurality of measurement points;

providing a plurality of leveling blocks including leveling blocks of at least three different heights, the plurality of leveling blocks including a first group of leveling blocks having a height of 0.125 inch, a second group of leveling blocks having a height of 0.25 inch, and a third group of leveling blocks having a height of 0.5 inch;

adhering a respective said leveling block at each of the plurality of measurement points, so that an upper surface of each respective leveling block is at the surface level elevation with the zero measurement point; and distributing a layer of self-leveling concrete over the concrete layer so that an upper surface of the self-leveling concrete is substantially planar with the upper surface of each of the leveling blocks.

2. The method of claim 1, further comprising a step of laying a flooring surface on the layer of self-leveling concrete.

3. The method of claim 1, wherein the surface level elevation at each of the plurality of measurement points is determined by a gas level.

4. The method of claim 1, wherein the surface level elevation at each of the plurality of measurement points is determined by a laser level.

5. The method of claim 1, wherein a lower surface of each of the plurality of leveling blocks has an adhesive layer and a releasable film covering the adhesive layer.

6. The method of claim 1, wherein the first, second, and third groups of leveling blocks each is formed of a different color to allow visual identification of the leveling blocks.

* * * * *